US008954894B2

(12) United States Patent
Lorenz

(10) Patent No.: US 8,954,894 B2
(45) Date of Patent: Feb. 10, 2015

(54) GESTURE-INITIATED SYMBOL ENTRY

(75) Inventor: Jon Lorenz, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1309 days.

(21) Appl. No.: 12/271,867

(22) Filed: Nov. 15, 2008

(65) Prior Publication Data

US 2014/0033135 A1    Jan. 30, 2014

(51) Int. Cl.
  *G06F 3/033*  (2013.01)
  *G06F 3/0488*  (2013.01)
  *G06F 3/0354*  (2013.01)
  *G06F 3/01*  (2006.01)

(52) U.S. Cl.
  CPC ........ *G06F 3/04883* (2013.01); *G06F 3/03549* (2013.01); *G06F 3/04886* (2013.01); *G06F 3/017* (2013.01)
  USPC ......................................... 715/863; 345/179

(58) Field of Classification Search
  CPC .............. G06F 3/04883; G06F 3/0482; G06F 3/03549; G06F 3/03545
  USPC .......................................... 715/863; 345/179
  See application file for complete search history.

(56) References Cited

U.S. PATENT DOCUMENTS

| 7,003,308 | B1 * | 2/2006 | Fuoss et al. | 455/466 |
|---|---|---|---|---|
| 7,590,535 | B2 * | 9/2009 | Williamson et al. | 704/235 |
| 7,894,836 | B1 * | 2/2011 | Fuoss et al. | 455/466 |
| 2004/0061888 | A1 * | 4/2004 | Braun et al. | 358/1.15 |
| 2005/0066291 | A1 * | 3/2005 | Lewak | 715/810 |
| 2006/0050061 | A1 * | 3/2006 | Aiken et al. | 345/173 |
| 2007/0040813 | A1 * | 2/2007 | Kushler et al. | 345/173 |
| 2007/0236475 | A1 * | 10/2007 | Wherry | 345/173 |
| 2008/0048991 | A1 * | 2/2008 | Freeman et al. | 345/173 |
| 2008/0055269 | A1 * | 3/2008 | Lemay et al. | 345/173 |
| 2008/0057926 | A1 * | 3/2008 | Forstall et al. | 455/415 |
| 2008/0094368 | A1 * | 4/2008 | Ording et al. | 345/173 |
| 2008/0094369 | A1 * | 4/2008 | Ganatra et al. | 345/173 |
| 2008/0094370 | A1 * | 4/2008 | Ording et al. | 345/173 |
| 2008/0098331 | A1 * | 4/2008 | Novick et al. | 715/835 |
| 2008/0165136 | A1 * | 7/2008 | Christie et al. | 345/173 |
| 2008/0235621 | A1 * | 9/2008 | Boillot | 715/810 |
| 2008/0320419 | A1 * | 12/2008 | Matas et al. | 715/863 |
| 2009/0031240 | A1 * | 1/2009 | Hildreth | 715/772 |
| 2009/0058822 | A1 * | 3/2009 | Chaudhri | 345/173 |
| 2009/0213134 | A1 * | 8/2009 | Stephanick et al. | 345/589 |

OTHER PUBLICATIONS

Kier et al.; Gesture-recognition with Non-referenced Tracking; © 2006, IEEE, 8 pages.*
Sharma et al.; speech-Gesture Drive Multiplmodal Interfaces for Crisis Management. © 2003; IEEE; 28 pages.*
Quek et al.; Gesture Cues for Conversational Interaction in Monocular Video; © 1999; IEEE; 8 pages.*

* cited by examiner

*Primary Examiner* — Linh K Pham
(74) *Attorney, Agent, or Firm* — Shook, Hardy & Bacon L.L.P.

(57) ABSTRACT

Apparatus, systems, and methods may operate to receive a symbol recognition process gesture indicating a starting point of symbol entry, to recognize a series of symbols as they are received subsequent to receiving the symbol recognition process gesture, and to instantiate the series of symbols as a symbol set upon receiving an indication that reception of the series of symbols is complete. Instantiating can serve to indicate an ending point of the symbol entry, and to provide the symbol set as a source of input to a process associated with an icon into which the symbol set has been moved, such as by dragging and dropping, or flicking. Additional apparatus, systems, and methods are disclosed.

25 Claims, 10 Drawing Sheets

GESTURE-INITIATED SYMBOL ENTRY

BACKGROUND

A graphical user interface (GUI) can be used to display objects that allow a user to interact with software applications. However, it is often inconvenient to provide data for use by the displayed objects when hand-held devices with limited keyboard functionality are used.

BRIEF DESCRIPTION OF THE DRAWINGS

Some embodiments are illustrated by way of example, and not limitation, in the figures of the accompanying drawings, in which.

DETAILED DESCRIPTION

Figure 1:
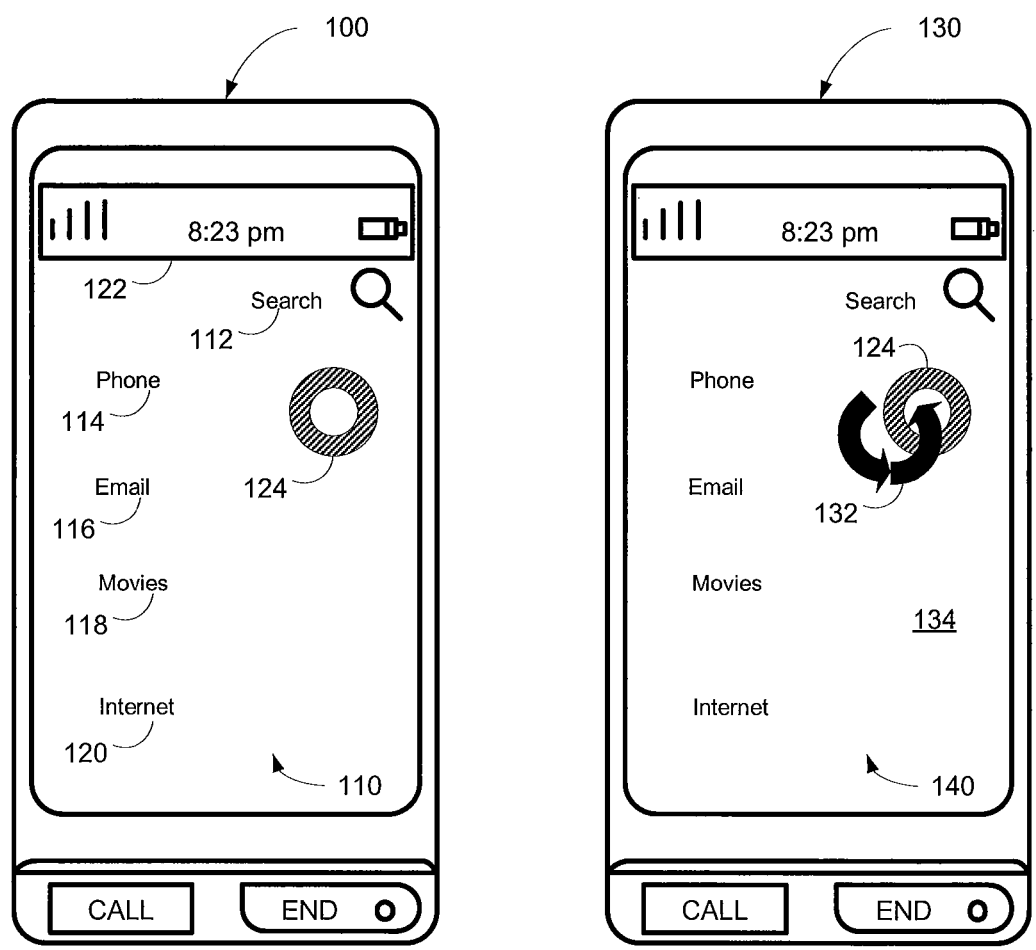
FIG. 1 illustrates gesture initiation as part of a GUI, according to various embodiments.

In the following detailed description, numerous specific details are set forth to provide a thorough understanding of claimed subject matter. However, it will be understood by those of ordinary skill in the art that claimed subject matter may be practiced without these specific details. In other instances, methods, apparatus or systems that would be known by one of ordinary skill have not been described in detail so as not to obscure claimed subject matter.

Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others of ordinary skill in the art. An algorithm is here, and generally, considered to be a self-consistent sequence of operations or similar processing leading to a desired result.

In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, throughout this specification discussions utilizing terms such as "processing," "computing," "calculating," "determining" or the like refer to actions or processes of a computing platform, such as a computer or a similar electronic computing device, that transform data represented as physical electronic or magnetic quantities within memories, registers, other information storage devices, transmission devices, or display devices of the computing platform.

This disclosure is directed to mechanisms that can be used to quickly enter symbolic data into applications, even when devices with limited keyboard functionality are used. These mechanisms include the use of gestures that initiate the reception of symbol sets, perhaps generated using a touch screen or stylus, to provide input to applications that reside within a particular electronic device.

In some embodiments, initiation gestures can be made in two or more dimensions (e.g., on a touch screen or in space), such as moving a stylus or fingertip on a touch surface to indicate an "open and do" circle. Once the gesture is recognized, the area designated by the gesture, or some predefined area nearby, can be used as a symbol recognition area.

Each subsequent gesture can then be recognized as a symbol in a series of symbols, such that the device being used can search for stored data that matches the series of symbols being entered in real time. Once the series is complete, the symbol series can be instantiated as a symbol set by moving the series to an icon to provide input to the application represented by the icon. For example, the series can be instantiated by dragging the series to an icon (e.g., a desktop object representing an application on a touch screen) and dropping the series into the icon. The series can also be instantiated by flicking the series into the icon. At this point, the application can process the symbol set and act upon it, just as if the symbol set had been created for the application using a conventional keyboard. Potential applications include email programs, network browsers, dialers, media players, and others.

For the purposes of this document, the term "electronic content" includes any digital data that may be presented to a user (e.g., visually or audibly presented), such as an electronic document, page-descriptive electronic content such as a page-descriptive electronic document, a media stream, a web page, a hypertext document, an image, digital video or a video recording, digital audio or an audio recording, animation, a markup language document, such as a HyperText Markup Language (HTML) or eXtensible Markup Language (XML) document, a form having blank components to accept entered data, or data describing the application of a GUI.

A "content element" includes any part of electronic content that is defined or discernable as a part. For example, a content element may be automatically discerned from a characteristic of the content element itself (e.g., a paragraph of an electronic document, or a file format designation) or may be manually defined by a user (e.g., a user-selected collection of symbols or words in an electronic document, a reviewer-selected portion of a digital image). Examples of content elements include portions of a page-descriptive document or other electronic document, such as pieces of electronic text or other material within an electronic document, comments, dynamic content in the form of portions of media streams, such as sections of digital video or frames or sets of frames of digital video or digital audio, dynamic content in the form of segments or frames of animations, electronic forms, form templates, form elements, form data, actuatable element specifications or executable instructions, and various elements presentable or accessible by reviewers within electronic content, including instances of scripted and non-scripted dynamic content and the like.

The term "rendering" used as a verb includes presenting or making accessible electronic content or content elements to be perceived, viewed, or otherwise experienced by a user, or made available for further processing, such as, for example, searching, digesting, printing, analyzing, distilling, or transforming by computational processes that may not include processing the intrinsic data structure describing the electronic content or content element.

The term "rendering" used as a noun includes human-perceivable representations of data that is within a machine and perception-specialized organizations of data defining such representations. For example, a rendering may include a pattern of human-perceivable matter or energy presented on an output device (e.g., a printer or display) by a machine, as well as the organization of data within a machine that defines such patterns. For example, such organizations of data may include the electronic configuration of a memory used by a graphics display processor, or a file containing an audio segment suitable for playing via an audio system of a computer.

The term "rendering module" may be taken to include systems, applications, and mechanisms for rendering or presenting electronic content to a user, including the presentation of content elements such as text, graphics, form element renderings, and other electronic content elements. An example of a rendering module includes a web browser component (e.g., Microsoft® Internet Explorer) or other component to render electronic content such as HTML pages. Another example of a rendering module includes the ADOBE® ACROBAT® electronic publishing program.

The term "rendering program" includes applications for rendering or presenting dynamic content to a reviewer. An example of a rendering program is the ADOBE® FLASH® Player 9 runtime software application. In many embodiments, a rendering module interacts with a rendering program to render dynamic content.

A "series of symbols" is two or more alphabetic, numeric, or other visually distinguishable characters in any language, including hiragana, katakana, and kanji.

FIG. 1 illustrates gesture initiation as part of a GUI 110, according to various embodiments. Here a device 100, 130 is shown in two states: the device 100 before gesture entry is initiated, and the device 130 after entry of the gesture 132 has begun.

It should be noted that, while the device 100 is shown as a cellular telephone in the various figures, any other kind of electronic device may be used. Thus, the device may comprise any type of electronic apparatus, including a PDA, a cellular telephone, a tablet computer, a laptop computer, a GPS locator, a multimedia player, etc.

In the GUI 110, several elements are shown. Here, the GUI 110 is used to display a cellular telephone status panel 122 (e.g., indicating signal strength, time of day, and battery condition), along with the availability of a search application icon 112, a dialing application icon 114, an e-mail application icon 116, a media player icon 118, an Internet browser icon 120, and a gesture reception area 124.

The device 130 has a GUI 140 that illustrates the entry of an initiation gesture 132. For example, if the device surface 134 comprises a touchpad surface, the gesture 132 may be entered as a two-dimensional gesture 132 on the surface of a device 130. Thus, recognition of the initiation gesture 132 may be confined to gestures 132 having beginning and ending points entered within or proximate to the gesture reception area 124. In some embodiments, gestures 132 may be entered and recognized in three-dimensional space, perhaps using multi-axis tilt, ultrasound, or infrared technologies, as is well-known to those of ordinary skill in the art.

The gesture 132 may comprise any type of figure, such as a common geometric figure, a signature, or some other gesture that is selected by the user to indicate that entry of a series of symbols is about to begin. Thus, once the initiation gesture at 132 is recognized, the subsequent recognition of individual symbols may commence.

Figure 2:
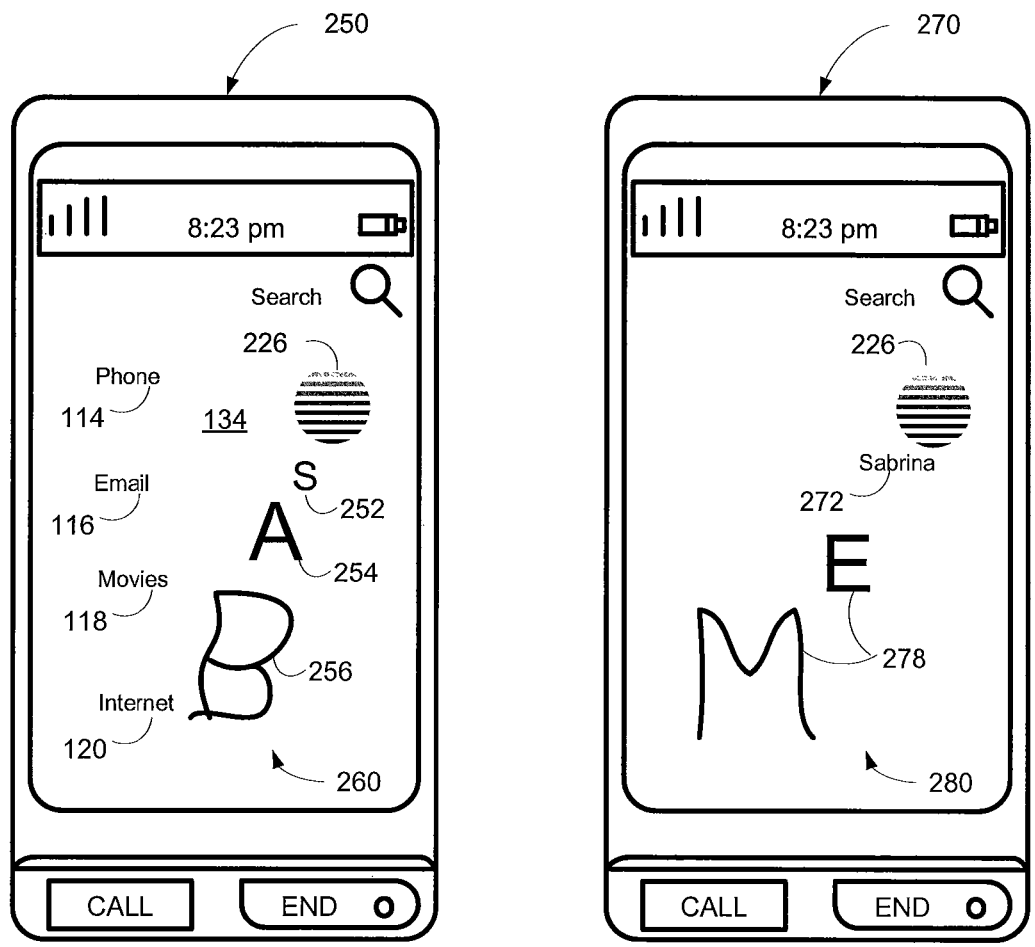
FIG. 2 illustrates symbol capture as part of a GUI, according to various embodiments.

FIG. 2 illustrates symbol capture as part of a GUI 260, 280 according to various embodiments. In this illustration, the gesture reception area 226 has changed form to indicate that subsequent gestures will be recognized as part of a series of symbols 252, 254, 236. In this case, entry of the name of a person "SABRINA" has begun. First, the gesture comprising the symbol "S" 252 is entered somewhere on the surface 134 of the device 250. The gesture comprising the symbol "S" 252 may be programmatically reduced or transformed so as to be represented by a standard alphanumeric character and moved toward the gesture reception area 226 by an application included in the device 250. Similarly, gestures equated with the subsequent symbols "A" 254 and "B" 256 can also be entered. Thus, the symbols 252, 254, and 256 may be entered as gestures, and recognized as symbols, one at a time, in the sequence that they are entered by the user.

In the GUI 280 of the device 270, subsequent symbols 278 are shown. Once these symbols 278 are entered and recognized, a series of symbols is formed. For example, the GUI 280 illustrates that the name "SABRINA" has been entered and recognized as a series of symbols 272. As long as additional symbols 278 are entered, the series of symbols 272 can be augmented.

Figure 3:
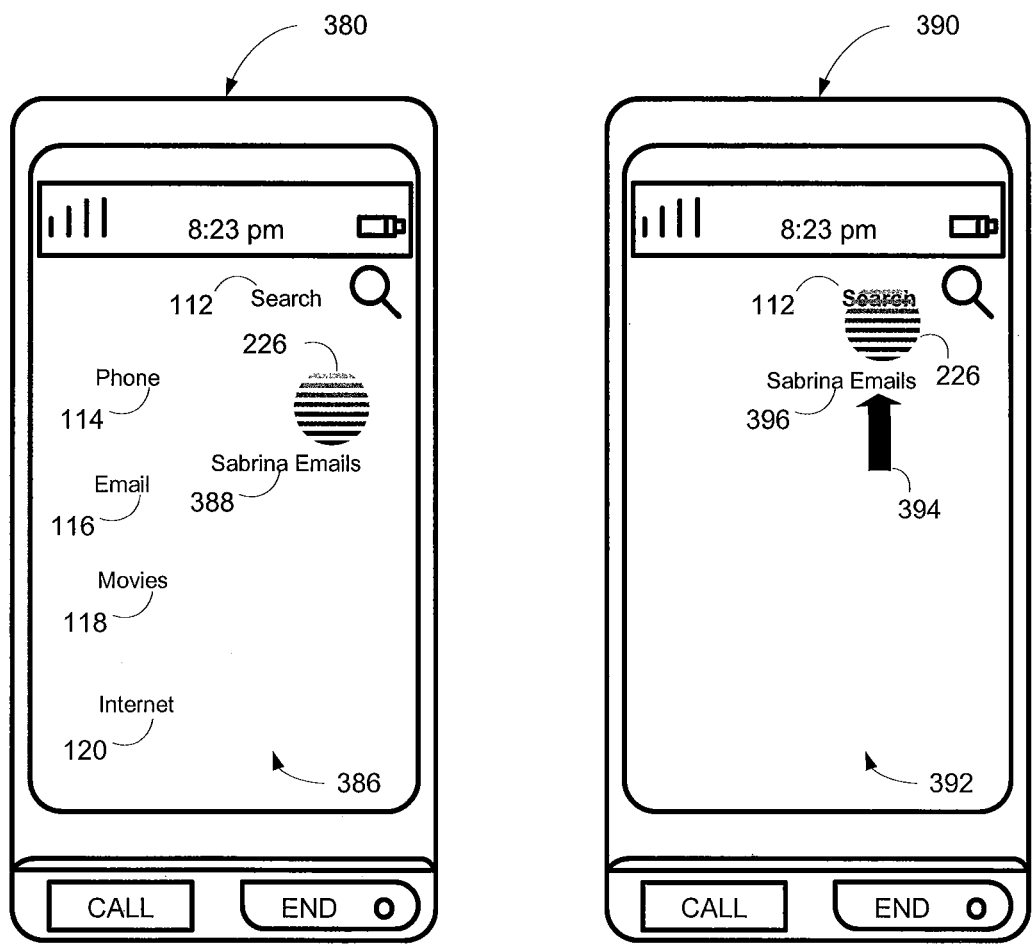
FIG. 3 illustrates instantiation of a symbol set according to various embodiments.

FIG. 3 illustrates instantiation of a symbol set 388 according to various embodiments. In the device 380, the GUI 386 illustrates a series of symbols 388 that includes the string of characters "SABRINA EMAILS". In the GUI 392 of the device 390, the series of symbols 388 becomes instantiated as a symbol set 396. This occurs when the series of symbols 388 is moved into an icon representing an application, such as by flicking the series of symbols 388 toward the icon, or dragging the series of symbols 388 in the direction of the arrow 394 and dropping the series of symbols into the icon—in this case the search application icon 112. Thus, in this particular example, the series of symbols 388 becomes instantiated as the symbol set 396, which represents the string of characters "SABRINA EMAILS".

The instantiated symbol set 396 can be used as data input by the application represented by the icon 112. Since the application comprises a search application, the characters in the symbol set 396 are used in this case to construct a search of the data contained in the device 390. The result might be a list, presented in the GUI 392, of all stored e-mail messages containing the term "SABRINA". Of course, many other applications are available, as can be seen in the GUI 386 of the device 380. Thus, the same symbol set 396 could be moved into any one of the icons 112, 114, 116, 118, or 120 to be processed by the corresponding applications. The interpretation and effect of the symbol set 396 would then depend on the particular application to which it is applied. Thus, many embodiments may be realized.

Figure 4:
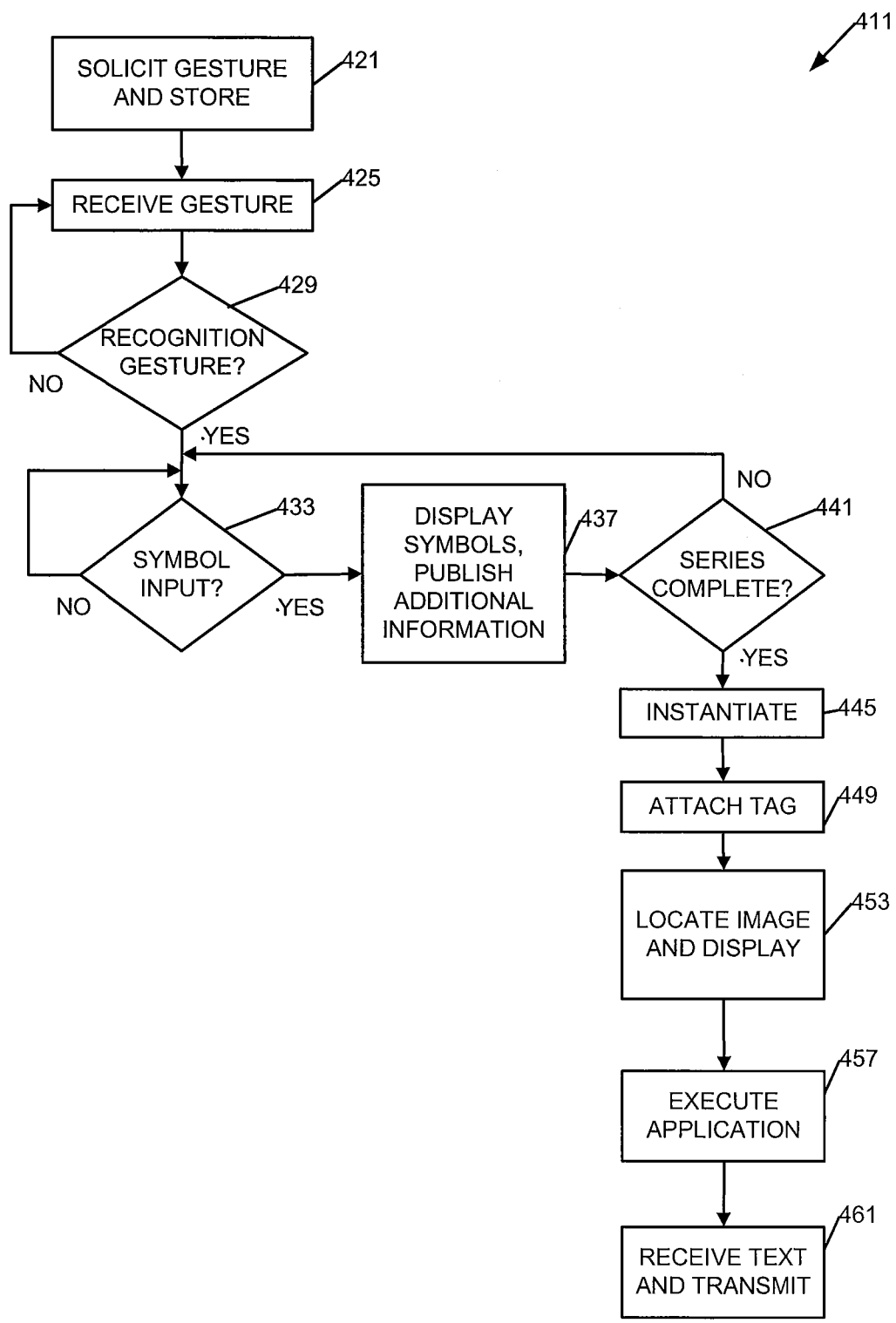
FIG. 4 is a flow diagram illustrating several methods according to various embodiments.

For example, FIG. 4 is a flow diagram illustrating several methods 411 according to various embodiments. Thus, a processor-implemented method 411 of gesture recognition to initiate the entry of symbols may begin at block 421 with soliciting entry of a user-created gesture (e.g., using a device having a touch screen), and perhaps storing the user-created gesture as a gesture that can be used to initiate the symbol recognition process for creating symbol sets in the future.

The method 411 may thereafter go on to include receiving a gesture entered by a user at block 425, and comparing the gesture entered by the user with the symbol recognition process gesture at block 429. If the gesture entered is not recognized as the symbol recognition process gesture at block 429, then the method 411 may include returning to block 425 to receive additional gesture input.

When the gesture entered by the user is determined to substantially match the symbol recognition process gesture, at block 429, the method 411 may include proceeding onward to recognizing a subsequent series of symbols. Thus, in some embodiments, recognition of symbols in a series proceeds only after the symbol recognition process gesture is recognized, such as where the method 411 includes initiating the symbol entry only upon recognizing a symbol recognition process gesture.

The method 411 may therefore include receiving a symbol recognition process gesture indicating a starting point of symbol entry. As noted previously, the symbol recognition process gesture may be received at a touch surface, or as a three-dimensional gesture in space. Other gesture entry mechanisms, such as may be effected by detecting trackball or mouse motions, can also be accommodated.

The method 411 may then go on to block 433 to include recognizing a series of symbols as they are received. If a subsequent gesture entry is not recognized as a symbol, the method 411 may continue with repeatedly checking for symbolic input at block 433. Thus, the symbols in a series may be received individually, in order, as described previously, such that the method 411 includes receiving the series of symbols, one at a time, in sequence.

If the entry of one or more symbols is recognized at block 433, the method may include displaying the recognized symbol(s) at block 437. Such activity may include displaying the series of symbols in sequence, as they are received, and in the order they are received, within a (designated) display area. The display area may include a GUI.

In some embodiments, the method 411 may include publishing additional symbols to the GUI as suggestions to complete the series of symbols, in real-time as the series of symbols are received. For example, if the user enters "EMA" as part of a series of symbols, the completed term "EMAIL" may be published to the user for selection. If the user enters "PHON" the terms "PHONE DIRECTORY" and "PHONE NUMBER" may be published as part of a variety of selection alternatives.

File names and/or icons for associated applications determined by the content of symbolic entries may be published alternatively, or in addition to the published suggestions. Thus, the activity at block 437 may including searching for suggestions for completing the series of symbols, searching for files associated with the series of symbols, and/or search for applications associated with the series of symbols. The search results may be published to the user. In this way, entering a series of symbols, even if only partially complete or correct, can result in the display of suggested or corrected completion symbols (e.g., alphanumeric character strings), file names, and/or application icons.

The method 411 may continue on to block 441 with determining whether an indication has been received that the series of symbols is complete (e.g., that the series of symbols have been moved into an icon, such as by flicking or dragging and dropping). If complete entry of the series has not been indicated, as determined at block 441, then the method 411 may include returning to block 433 to determine whether further symbols have been entered.

If complete entry of the series has been indicated, as determined at block 441, then the method 411 may include instantiating the series of symbols as a symbol set at block 445, where instantiating serves to indicate an ending point of the symbol entry. At this point, the symbol set can be provided as a source of input to a process associated with the desktop object, such as an application. Thus, for example, a series of recognized symbols can be transformed into instantiated input for a process, responsive to determining that the set has been moved into an icon representing the process.

The method 411 may go on to include attaching one or more meta-data tags (perhaps including at least some of the series of symbols) to the process represented by the icon into which they are dropped or flicked. In this way, meta-data entered as a series of symbols may be quickly and easily attached as tagged meta-data to processes, including applications.

In some embodiments, the method 411 may go on to include locating a stored image associated with the symbol set at block 453. Other activities conducted at block 453 may include displaying the stored image on a display surface. For example, the instantiated symbol set may be used to locate and display a photograph stored in an album on the user device.

The method of 411 may include, at block 457, executing an application, perhaps in response to receiving the series of symbols as an instantiated symbol set that has been moved into an icon representing the application. In this way, the symbol set can serve as input to the application.

For example, the application may comprise a telephone application, such that the activities at block 457 include associating the symbol set with a name, and publishing one or more telephone numbers associated with the name in a GUI. Or the application may comprise a network browser, such that the activities at block 457 include initiating a search in the browser using at least a portion of the symbol set as a search string. In another case, the application may comprise a mapping application, such that the activities at block 457 include publishing a map comprising a location associated with a name included in the symbol set. In this way, the symbol set may serve to assist in finding a mapped location.

The method 411 may comprise receiving subsequent text (e.g., at a touch interface) at block 461. Such text may serve as additional data to be used by the referenced application (e.g., the application represented by the icon into which the symbol set has been dropped or flicked). In one scenario, the symbol set might include the name of a message recipient, the application might comprise a text messaging application, and the subsequent text entered might be used to make up the message that is to be transmitted. Thus, further activities at block 461 may include transmitting the subsequent text as a text message to an address associated with a name included in the symbol set. In this way, many other embodiments may be realized.

It should be noted that the methods described herein do not have to be executed in the order described, or in any particular order. Moreover, various activities described with respect to the methods identified herein can be executed in iterative, repetitive, serial, or parallel fashion. Activities within various methods may also be combined, to include combination across the various figures used herein. Information, including parameters, commands, operands, and other data, can be sent and received in the form of one or more carrier waves.

It should also be noted that in every case where the activity of displaying or rendering is denoted, information may be communicated (e.g., transmitted and received) between a variety of entities to enable such display or rendering activity. For example, a server may transmit information to a receiving entity, such as one or more clients or workstations, to enable displaying or rendering the various visual elements described.

Figure 5:
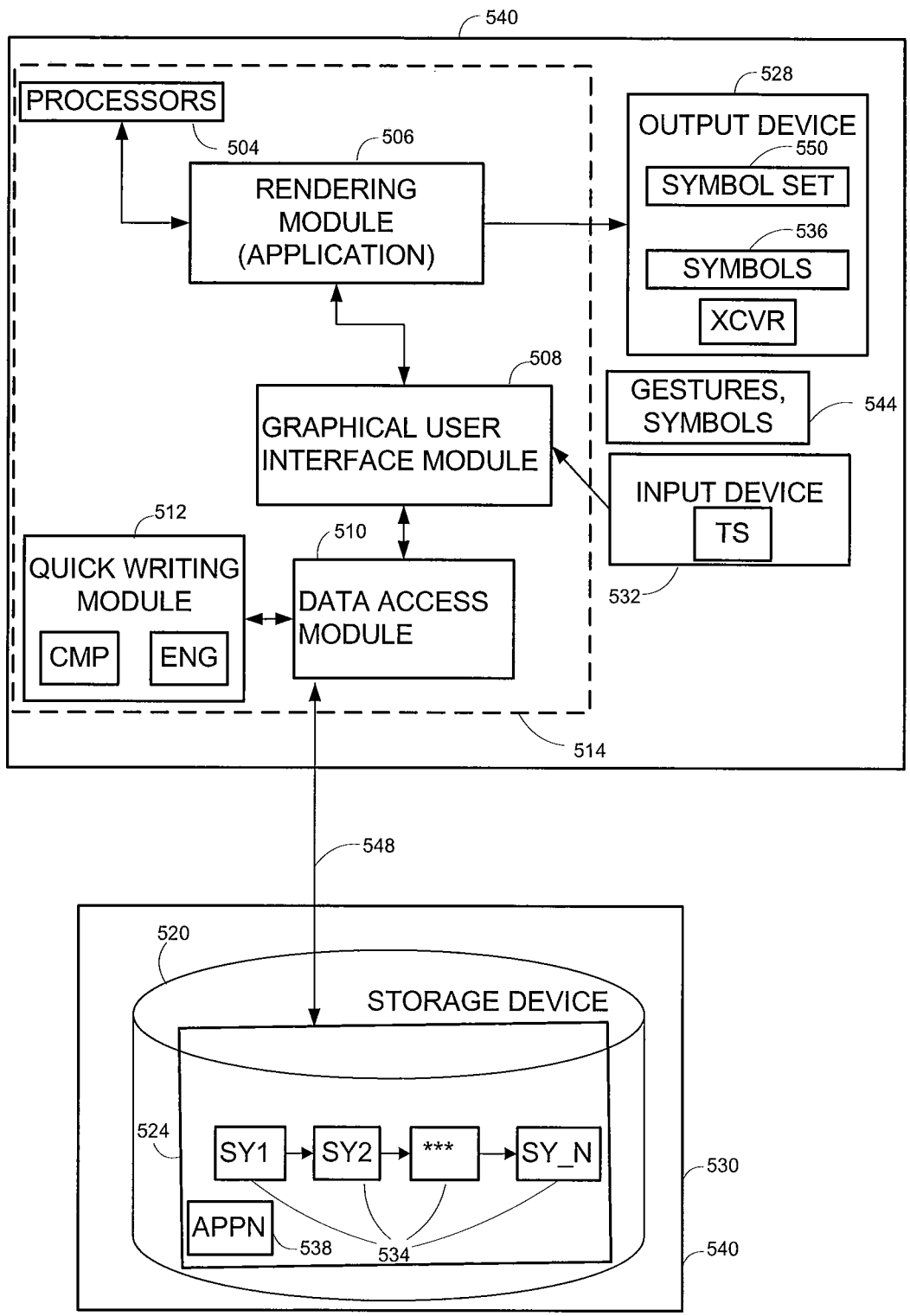
FIG. 5 is a block diagram of apparatus and systems according to various embodiments.

FIG. 5 is a block diagram of apparatus 540 and systems 500 according to various embodiments. The system 500 may include a number of modules such as one or more processors 504, a rendering module 506, a GUI module 508, a data access module 510, and a quick writing module 512. The rendering module 506 and the GUI module 508 may take the form of an integral module, or exist a separate modules, as shown. These modules may be associated within a machine 514, such as an apparatus that comprises a personal digital assistant (PDA), a laptop computer, a tablet computer, a personal computer, a workstation, or a server, as indicated by their containment within the dashed box.

In order to avoid obscuring the components of FIG. 5, connecting lines between each of the elements within the machine 514 have not been shown. However, those of ordinary skill in the art will understand that any of the individual elements shown to be located within the confines of the machine 514 may be operably coupled to any other element within the machine 514. Similarly, those of ordinary skill in the art will understand that any of the components shown to be located within the confines of the machine 514 may also be located outside the machine 514, and appropriately coupled to the machine 514 via wired or wireless networks or other interface mechanisms.

The data access module 510 may be used by the rendering module 506 and the quick writing module 512 to access a storage device 520, such as a database, a memory, a disk, or other storage device. The storage device 520 may serve to contain one or more items of electronic content 524. The data access module 510 may operate to read from and/or write to the electronic content 524 and may provide reading and writing services for the benefit of other system modules, including the GUI 508, the processor 504, the rendering module 506, and the quick writing module 512. The electronic content 524 may comprise one or more content elements 534, such as applications 538, and various gestures that are to be recognized, including symbols SY1, SY2, . . . , SY_N.

The electronic content 524 may comprise a document, such as a word processing document, text, drawings, a data file, a spreadsheet, audio recordings, video recordings, multimedia presentations, and other types of content. Documents may be organized according to a page descriptive format, which includes a portable document format, where "portable document format" means a device-independent and display resolution-independent fixed-layout document format, including the text and fonts, images, and graphic paths associated with the document. The format may comprise a representation of a two-dimensional document, or a three-dimensional document. An example of a commercially available portable document format (PDF) is the format described in "PDF Reference", sixth edition, ADOBE® Portable Document Format, Version 1.7, November 2006. Many other embodiments may be realized.

The data access module 510 may be present in some embodiments, and absent in others. When present, the data access module 510 may operate as a mediator between the various components of the system 500 and the electronic content 524. For example, the storage device 520 may be included in a remote server 530. The storage device 520 may also form part of an apparatus 540.

The rendering module 506 may be operably coupled to an output device 528, such as a wired or wireless transceiver, a display screen, a printer, or a loudspeaker, among others. This output device 528 may be used for communicating content elements 534, symbols 536, and symbol sets 550, via wired/wireless transmission, and/or by presenting renderings of the content elements 534, as well as individual symbols 536 when they are received and recognized, and symbol sets 550 that have been instantiated. Thus, rendering may take the form of displaying the content elements 534, symbols 536, symbols sets 550 as shown in FIGS. 1-3.

A GUI module 508 may be operably connected to the rendering module 506 and the data access module 510. The rendering module 506 may comprise a portable document format processing program in some embodiments.

The GUI module 508 may receive input from input devices 532 (e.g., a keyboard, a mouse, a trackball, voice recognizer, touch pad, touch screen, etc.), including user input 544 comprising gestures and/or symbols that may be stored or recalled as part of the electronic content 524. Thus, many embodiments may be realized.

For example, a machine 514 may form part of an apparatus 540 comprising one or more processors 504 and a quick writing module 512 to initiate symbol entry upon recognizing a symbol recognition process gesture, to recognize a series of symbols as they are received subsequent to the receiving of the symbol recognition process gesture, and to initiate one of beginning execution or continuing execution of an application by the processor in response to receiving the series of symbols as a symbol set that has been moved into an icon associated with the application, the symbol set serving as input to the application.

The input device 532 may comprise a touch surface TS, and thus the apparatus may comprise a touch surface TS coupled to the processor(s) 504, such that the touch surface TS can be used to receive the symbol recognition process gesture, the series of symbols, or both. The output device 528 may comprise a wireless transceiver XCVR communicatively coupled to the processor(s) 504, such that the wireless transceiver XCVR can be used to transmit at least a portion of the symbol set.

In some embodiments, the apparatus 540 comprises a memory (such as the storage device 520 to store the symbol recognition process gesture (perhaps as part of one or more symbols SY1, SY2, . . . , SY_N). The apparatus 540 may also include a comparison module CMP, perhaps as part of the quick writing module 512, to compare a stored symbol recognition process gesture with a gesture received from a touch surface.

The quick writing module 512 may also include one or more search engines ENG to search a database (e.g., as part of the content 534) stored in the apparatus 540 to locate data (e.g., stored symbol data SY1, SY2, . . . , SY_N) associated with at least some of the series of symbols that have been entered using the input device 532. The search engines ENG can be used to search for suggestions, icons, and/or applications to be published to the user in conjunction with the series of symbols as they are received.

In some embodiments, the apparatus 540 comprises an integral display as part of an output device 528 to display the series of symbols as they are received on a display area, where the display area is included in a GUI, perhaps managed by the GUI module 508. Still further embodiments may be realized.

For example, a system 500 may comprise one or more of the machines 514, perhaps as part of an apparatus 540. As noted previously, the apparatus 540 may comprise a server device or a client device. Thus, a system 500 may comprise a server device 530, and one or more client devices (in the form of apparatus 540) communicatively coupled to the server device 530, perhaps via a network 548. The system 500 may also comprise one or more storage elements 520, perhaps as part of one of the apparatus 540, or as part of a server device 530. One or more of the client devices 540 or the server devices 530, 540 may comprise an output device 528, such as a display, as well as any part of the machine 514 or storage device 520.

Figure 6:
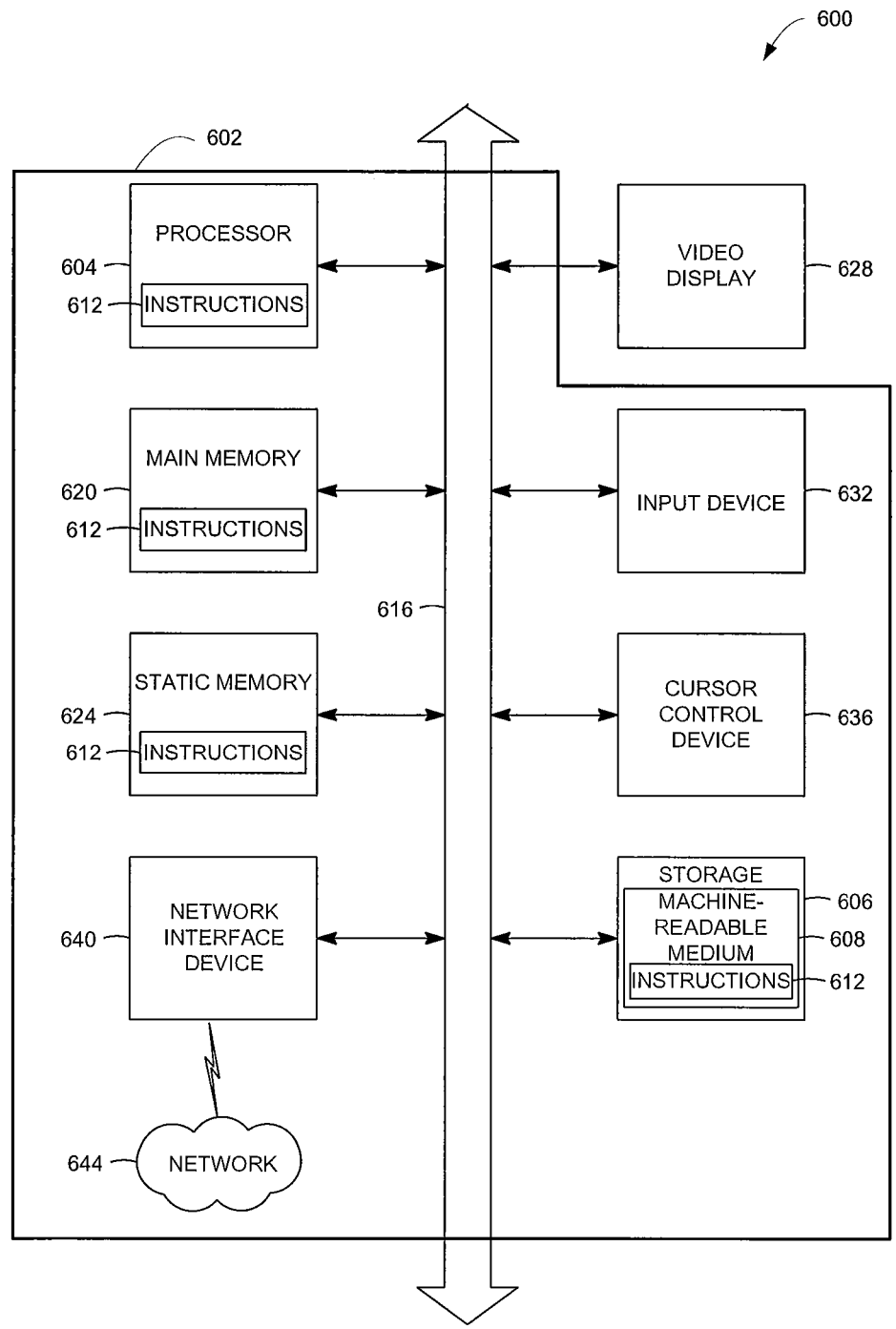
FIG. 6 is a block diagram of an article of manufacture, including a machine, according to various embodiments.

FIG. 6 is a block diagram of an article 600 of manufacture, including a machine 602, according to various embodiments. Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment.

Thus, other embodiments may be realized. For example, an article 600 of manufacture, such as a computer, a memory system, a magnetic or optical disk, some other storage device, and/or any type of electronic device or system may include one or more processors 604 coupled to a machine-readable medium 608 such as a memory (e.g., removable storage media, as well as any memory including an electrical, optical, or electromagnetic conductor) having instructions 612 stored thereon (e.g., computer program instructions), which when executed by the one or more processors 604 result in the machine 602 performing any of the actions described with respect to the methods above.

The machine 602 may take the form of a computer system having a processor 604 coupled to a number of components directly, and/or using a bus 616. Thus, the machine 602 may be similar to or identical to the system 500, the machine 514, or the apparatus 540 shown in FIG. 5.

Turning now to FIG. 6, it can be seen that the components of the machine 602 may include main memory 620, static or non-volatile memory 624, and mass storage 606. Other components coupled to the processor 604 may include an output device 628, such as a video display, an input device 632, such as a keyboard, and a cursor control device 636, such as a mouse. A network interface device 640 to couple the processor 604 and other components to a network 644 may also be coupled to the bus 616. The instructions 612 may further be transmitted or received over the network 644 via the network interface device 640 (shown here as separate from the output device 528 of FIG. 5) utilizing any one of a number of well-known transfer protocols (e.g., the HyperText Transfer Protocol). Any of these elements coupled to the bus 616 may be absent, present singly, or present in plural numbers, depending on the specific embodiment to be realized.

The processor 604, the memories 620, 624, and the storage device 606 may each include instructions 612 which, when executed, cause the machine 602 to perform any one or more of the methods described herein. For example, some embodiments may comprise a machine-readable medium having instructions stored therein for causing a machine to implement a method that comprises any of the activities described and shown with respect to FIG. 4.

In some embodiments, the machine 602 operates as a standalone device or may be connected (e.g., networked) to other machines. In a networked environment, the machine 602 may operate in the capacity of a server or a client machine in server-client network environment, or as a peer machine in a peer-to-peer (or distributed) network environment. The machine 602 may comprise a personal computer (PC), a tablet PC, a set-top box (STB), a PDA, a cellular telephone, a web appliance, a network router, switch or bridge, or any machine capable of executing a set of instructions (sequential or otherwise) that specify actions to be taken by that machine. Further, while only a single machine 602 is illustrated, the term "machine" shall also be taken to include any collection of machines that individually or jointly execute a set (or multiple sets) of instructions to perform any one or more of the methodologies discussed herein.

While the machine-readable medium 608 is shown as a single medium, the term "machine-readable medium" should be taken to include a single medium or multiple media (e.g., a centralized or distributed database, and/or associated caches and servers, and or a variety of storage media, such as the processor 604 registers, memories 620, 624, and the storage device 606) that store the one or more sets of instructions 612. The term "machine-readable medium" shall also be taken to include any medium that is capable of storing, encoding or carrying a set of instructions for execution by the machine and that cause the machine 602 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

FIGS. 7-10 illustrate several additional embodiments in which the apparatus, systems, and method described herein may be realized. In each case, the electronic devices, GUIs, apparatus, and systems of FIGS. 1-3 and 5-6 may be substituted for similar or identical devices, user interfaces, apparatus, and systems shown in FIGS. 7-10. Similarly, the activities of the methods 411 in FIG. 4 may be substituted for or added to the operations of the methods described with respect to and shown in FIGS. 7-10.

Figure 7:
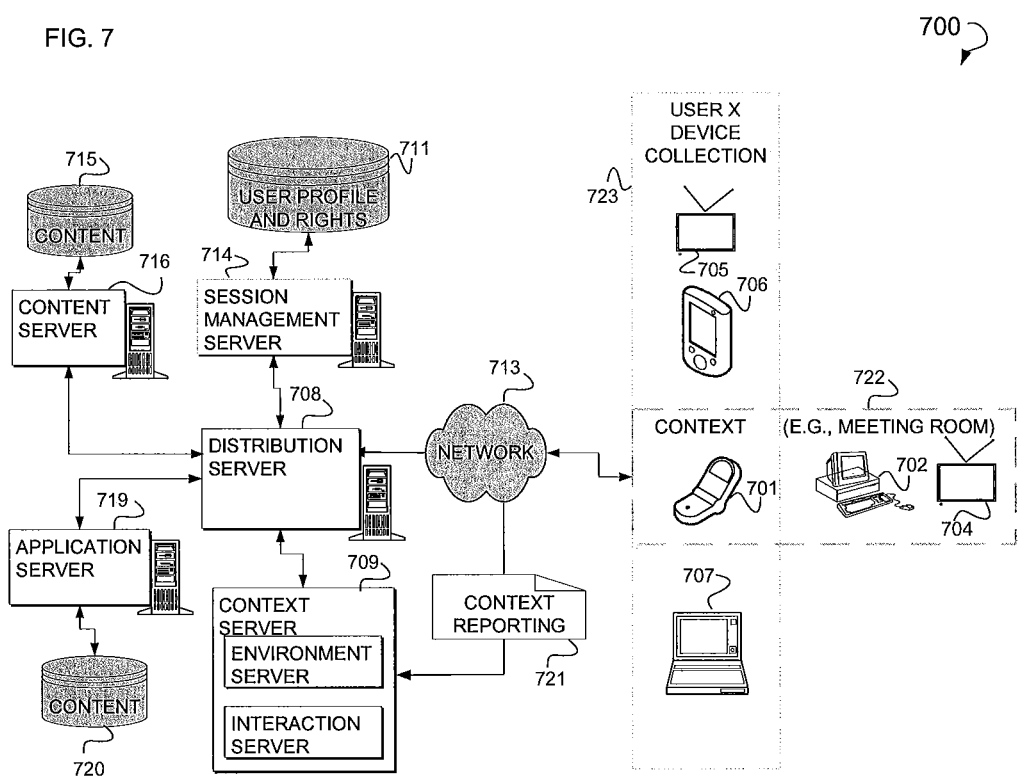
FIG. 7 is a diagram of an example system illustrating the intersection between user devices and a context according to various embodiments.

FIG. 7 is a diagram of an example system 700 illustrating the intersection between user devices and a context according to various embodiments. For example, the system 700 may comprise any of the systems shown in FIGS. 5 and 6. Shown in FIG. 7 is a user device collection, referenced herein at 723, that includes a number of devices. These devices utilized by a user include, for example, a television 705, Personal Digital Assistant (PDA) 706, cell phone 701, and laptop computer (e.g., "laptop") 707. In most embodiments, the devices of FIG. 7 may include any one or more of the devices shown in FIGS. 1-3.

In some example embodiments, one or more of these devices may participate in a context, referenced herein at 722, with other devices. These other devices include a computer 702 and a television 704. Within the context 722, the cell phone 701, computer 702, and television 704 may share an asset such as content or an application. In some example embodiments, one or more of the various devices in the context 722 may engage in context reporting through the generation of a context report 721. The context report 721 includes information relating to the devices and users participating in a context. The context report 721 is transmitted across the network 713 and is received by, for example, the distribution server 708. The context report 721 may be formatted using an eXtensible Markup Language (XML). The network 713 may be an Internet, a Local Area Network (LAN), a Wide Area Network (WAN), or some other suitable type of network as associated topology.

In some example embodiments, operatively connected to the network 713, is the previously referenced distribution server 708. Operatively connected includes a physical or logical connection. Operatively connected to the distribution server 708 may be a session management server 714, a context server 709, a content server 716, and an application server 719. These various servers (e.g., 708, 714, 709, and 716) may participate in a cloud computing paradigm. Additionally, these various servers may be implemented on a single computer system, or multiple computer systems. In some example embodiments, the distribution server is used to manage data flowing from the context 722, and to route this data.

The context server 709 includes an environment server and an interaction server. The interaction server tracks the interactions between devices in the context 722. Interactions include the sharing of assets between devices in the context 722. The environment server tracks the environment within which the interaction occurs. The environment includes data relating to the interaction such as the physical location of the devices participating in the context, the time and date of participation by the devices within the context 722, the amount and type of assets shared and other suitable information.

The session management server 714 is used to establish and manage a session. A session is an environment that is uniquely identified via a unique numeric identifier (e.g., a session ID) so as to regulate participants in the session. Participants may use a session identifier in combination with a user ID and/or device ID to facilitate their participation in a session. Operatively connected to the session management server 714 is a user profile and rights data store 711 that includes the session ID, the user ID, and/or device ID. Right include legal rights associated with an asset and its use. Additionally illustrated is a content server 716 that serves an asset in the form of content to context participants. Content includes images, video, audio-video, and text-based content. This content is stored in the content data base 715 that is operatively connected to the content server 716. Additionally, an application server 719 is shown that is used to serve applications to context participants. Applications include executables, code modules, software components, and software applications. These applications are stored in the content database 720. These applications may be used to enhance, augment, supplement, or facilitate the functionality of one or more of the devices participating in the context 722.

Figure 8:
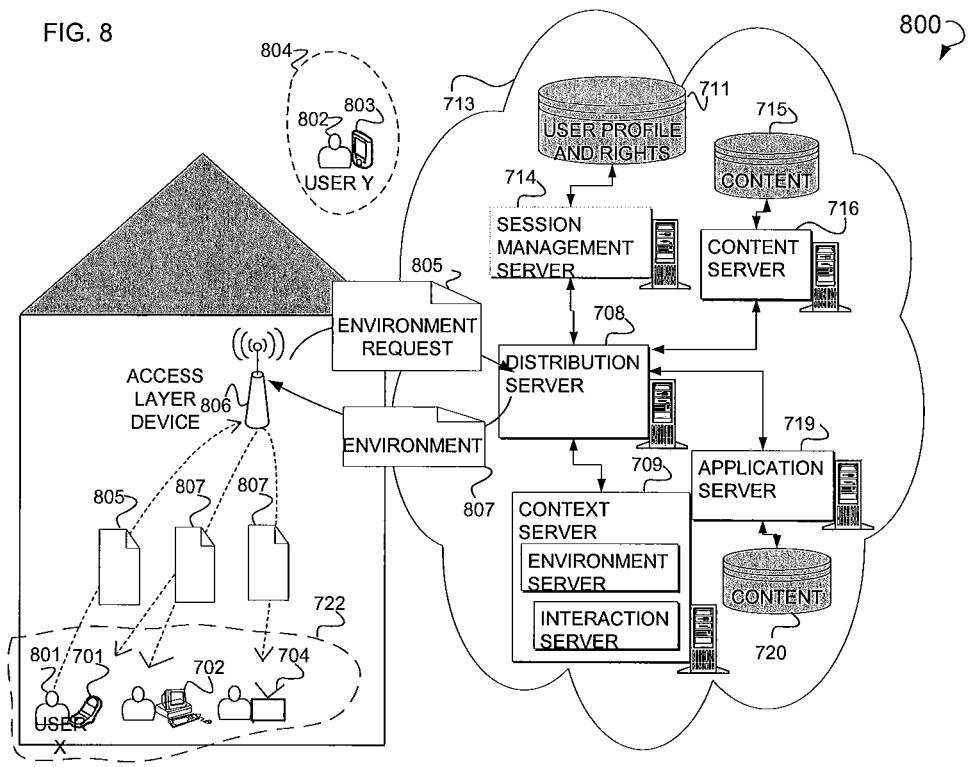
FIG. 8 is a diagram of an example system used to retrieve an environment for use in participating in a context according to various embodiments.

FIG. 8 is a diagram of an example system 800 used to retrieve an environment for use in participating in a context according to various embodiments. For example, the system 800 may comprise any of the systems shown in FIGS. 5 and 6. Shown in FIG. 8 is a user 801, referenced as "user x," that is associated with the cell phone 701. This user 801 is also associated with the user device collection 723. Further, shown is the computer 702 and television 704. As previously illustrated in FIG. 7, the cell phone 701, computer 702, and television 704 all participate in the context 722. This context may be in the form of a meeting occurring in a physical structure. In some example embodiments, the user 801 generates an environment request 805 that is received by an access layer device 806. This access layer device 806 transmits this environment request 805 across the network 713. The environment request 805 may include information relating to the relative physical location context participants, where information pertaining to this relative location is requested via the environment request 805. The distribution server 708, or one of the other servers (e.g., 708, 714, 709, and 716), may transmit an environment 807. This environment 807 may be distributed by the access layer device 806 to one or more of the context participants (e.g., the cell phone 701, computer 702, or television 704). Additionally, illustrated is a user 802, referenced as a "user y." This user 802 may have their own context 804 in which the PDA 803 participates. In some example embodiments, the content 804 and context 722 may be combined together to form a single context. This combination of contexts may occur where the PDA 803 joins the context 722.

Figure 9:
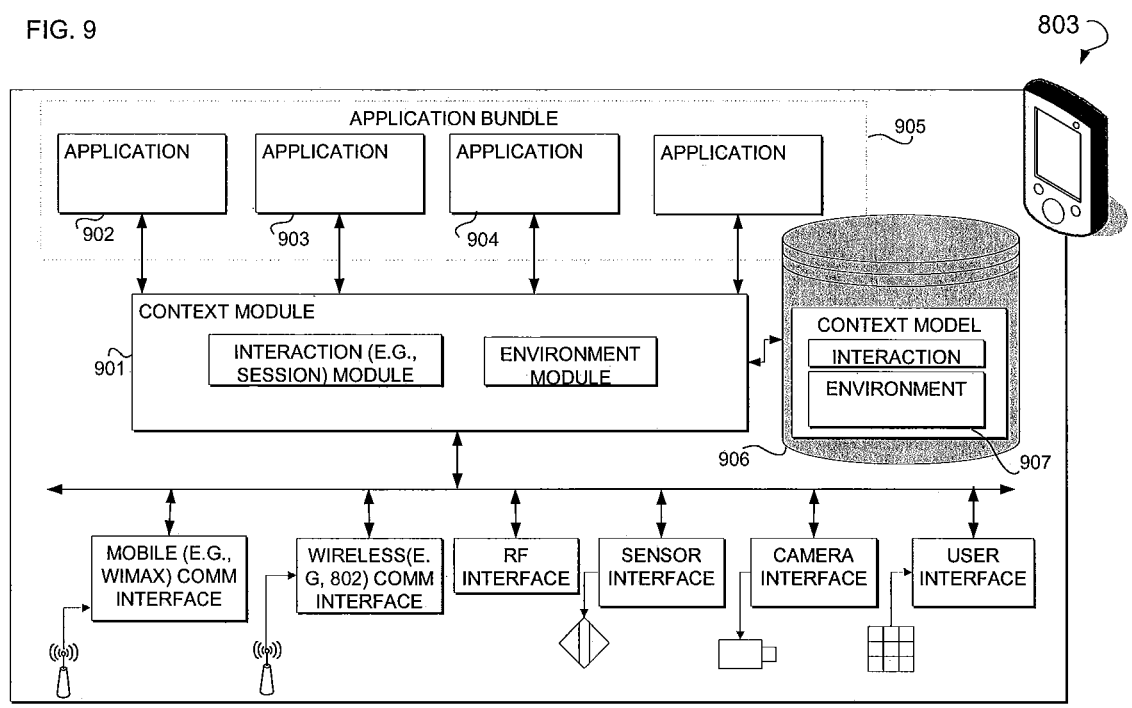
FIG. 9 is a block diagram of an example personal digital assistant (PDA) that includes functionality that enables the PDA to interact with other devices in a context, environment, or session, according to various embodiments.

FIG. 9 is a block diagram of an example PDA 803 that includes functionality that enables the PDA 803 to interact with other devices in a context, environment, or session according to various embodiments. For example, the PDA 803 may comprise any of the devices shown in FIGS. 1-3, or the apparatus or systems of FIGS. 5-6. Thus, the various blocks illustrated herein may be implemented by a computer system as hardware, firmware, or software.

Shown in FIG. 9 is a context module 901 that includes an interaction module. This interaction module may be used to establish a session in which devices may participate. Additionally, the context module may include an environment module that is used to generate the environment request 805, and to process the environment 807. Operatively connected to the context module 901 is an application bundle 905 (e.g., a suite of applications). Included in this application bundle 905 are applications 902 through 904. These applications may be used to process assets including content and applications. Process includes, for example, display, play, record, and execute. Example applications include FLASH™ of Adobe Systems, Inc., ACROBAT™ of Adobe Systems, Inc., PHOTOSHOP™ of Adobe Systems, Inc., or some other suitable application. Additionally, operatively connected to the context module 901 is a data store 906 that includes environment data 907 as part of a context model. Included as part of this context model may be session information including a session ID, user ID, and/or device ID. Additionally, included as part of this environment data 907 is the environment 807.

Figure 10:
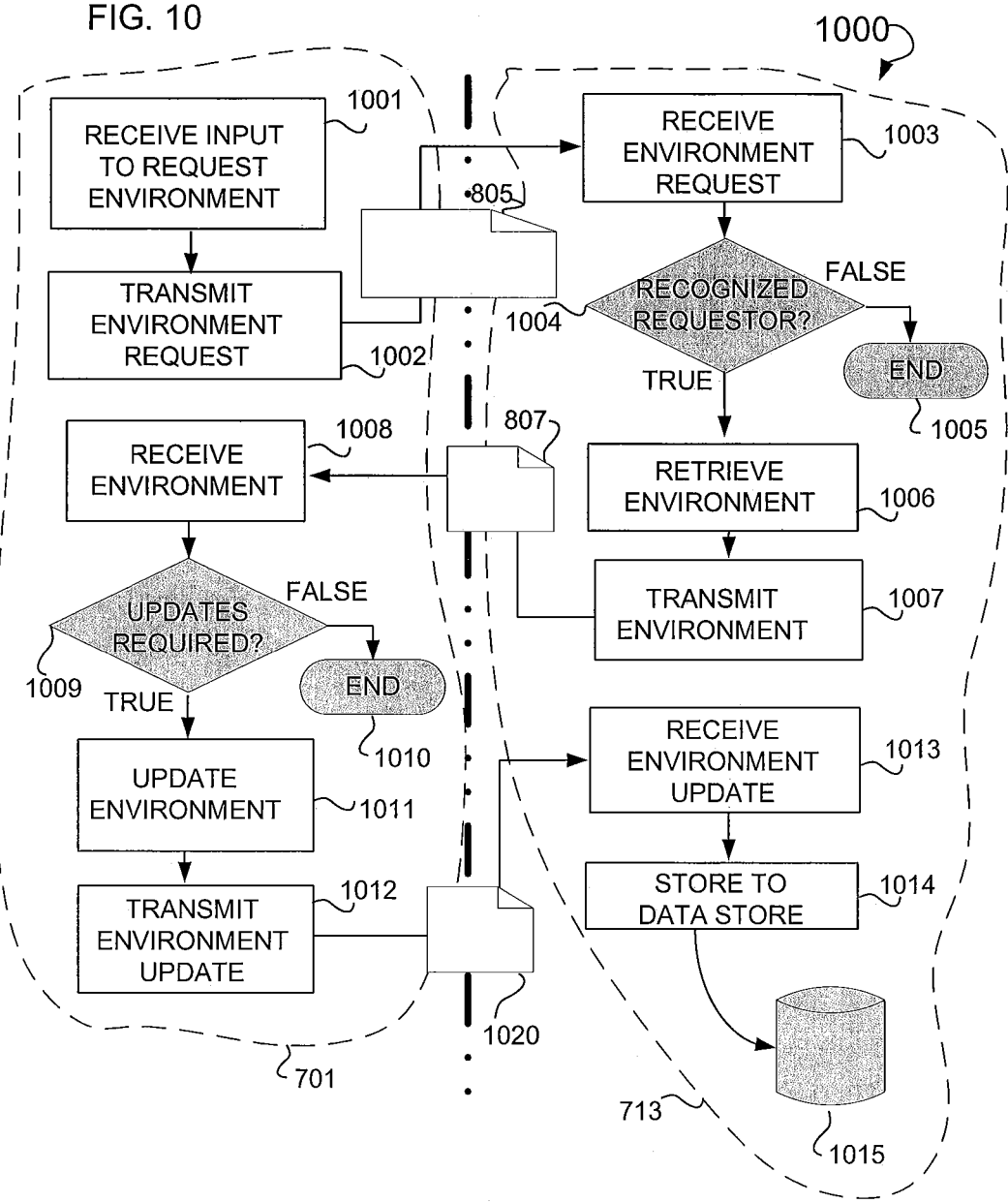
FIG. 10 is a dual-stream flow chart illustrating an example method used to request and receive an environment, and to generate an environment update according to various embodiments.

FIG. 10 is a dual-stream flow chart illustrating an example method 1000 used to request and receive an environment, and to generate an environment update according to various embodiments. As noted previously, any of the activities of method 411 may be added to or substituted for the operations shown in FIG. 10, which include operations 1001 through 1002, and 1008 through 1012. These various operations may be executed by the cell phone 701, or other suitable device that interacts in a context. Also shown are operations 1003 through 1007, and 1013 through 1014. These various operations are executed with the network 713 and the various servers (e.g., 708, 714, 709, and 716) illustrated therein. For example, the distribution server 708 may execute these various operations 1003 through 1007, and 1013 through 1014.

Shown is an operation 1001 that, when executed, receives input to request an environment. This input may be generated by an input device such as a touch screen, mouse, keyboard, light pen, or other suitable input device.

Operation 1002 is executed to transmit the environment request 805. Operation 1003, when executed, receives the environment request.

Decisional operation 1004 is executed to determine whether the device, and user associated therewith, is recognized as being able to request an environment. Where decisional operation 1004 evaluates to "false," a termination condition 1005 is executed as the requesting device or user is unrecognized. In case where decisional operation 1004 evaluates to "true," an operation 1006 is executed.

Operation 1006, when executed, retrieves an environment from, for example, the context server 109 and data store associated therewith (not pictured). Operation 1007 is executed to transmit the environment 807. Operation 1008 is executed to receive the environment 807.

In some example embodiments, the operation 1008 is executed by one of more of the interfaces shown in FIG. 9. A decisional operation 1009 is executed to determine whether an update of the environment 807 is required. In cases where decisional operation 1009 evaluates to "false," a termination condition 1001 is executed. In cases where decisional operation 1009 evaluates to "true," an operation 1011 is executed. Operation 1011 is executed to update the environment 807. This update may include additional location information relating to the cell phone 701, or other device participating in the context 722.

Operation 1012 is executed to transmit an environment update 1020. This environment update 1020 is received through the execution of operation 1013. Operation 1014 is executed to store the environment update 1020 into a data store 1015.

Implementing the apparatus, systems, and methods of the various embodiments may provide the ability to quickly enter symbolic data into a variety of applications, even when the device used to house the applications has limited keyboard/keypad data entry capability. Greater operational efficiency and user satisfaction may result.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). Modules may include hardware circuitry, optical components, single or multi-processor circuits, memory circuits, software program modules and objects, firmware, and combinations thereof, as appropriate for particular implementations of various embodiments. The term "module" includes an identifiable portion of code, data, or a computational object to achieve a particular function, operation, processing, or procedure.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).).

Embodiments may, for example, be implemented as a stand-alone application (e.g., without any network capabilities), a client-server application or a peer-to-peer (or distributed) application. Embodiments may also, for example, be deployed by SaaS, Application Service Provider (ASP), or utility computing providers, in addition to being sold or licensed via traditional channels.

Although embodiments of the invention have been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those of ordinary skill in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of ordinary skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A processor-implemented method comprising:
receiving a symbol recognition process gesture indicating a starting point of symbol entry;
subsequent to the receiving of the symbol recognition process gesture, recognizing a series of symbols as they are received by searching for data representing an alphanumeric character that matches a received symbol in the series of symbols; and
instantiating the series of symbols as a symbol set comprising a string of alphanumeric characters matching the series of symbols upon receiving an indication that the string of alphanumeric characters has been moved from a first location into an icon at a second location where the icon represents a first application of a plurality of applications, wherein the instantiating serves to indicate an ending point of the symbol entry, and to provide the symbol set comprising the string of alphanumeric characters as a source of input to the first application represented by the icon.

2. The method of claim 1, further comprising:
soliciting entry of a user-created gesture by a device having a touch screen; and storing the user-created gesture as the symbol recognition process gesture.

3. The method of claim 1, further comprising:
receiving a gesture entered by a user;
comparing the gesture entered by the user with the symbol recognition process gesture; and
proceeding to the recognizing when the gesture entered by the user substantially matches the symbol recognition process gesture.

4. The method of claim 1, wherein the receiving of the symbol recognition process gesture comprises:
receiving the symbol recognition process gesture at a touch surface.

5. The method of claim 1, further comprising: receiving the series of symbols at a touch surface.

6. The method of claim 1, further comprising: receiving the series of symbols, one at a time, in sequence.

7. The method of claim 1, further comprising:
displaying the series of symbols in sequence, as they are received within a display area, the display area including a graphical user interface.

8. The method of claim 1, further comprising:
attaching a meta-data tag including at least some of the series of symbols to the process.

9. A processor-implemented method comprising:
initiating symbol entry upon recognizing a symbol recognition process gesture;
recognizing a series of symbols as they are received subsequent to the recognition of the symbol recognition process gesture, wherein recognizing a symbol in the series of symbols is achieved by searching for data representing an alphanumeric character matching the symbol; and
executing an application of a plurality of applications in response to receiving the series of symbols as an instantiated symbol set comprising a string of alphanumeric characters matching the series of symbols that has been dragged into an icon associated with the application of the plurality of applications, wherein the symbol set comprising the string of alphanumeric characters serves as input to the application represented by the icon that received the symbol set.

10. The method of claim 9, wherein the receiving of the symbol recognition process gesture comprises:
receiving the symbol recognition process gesture as a three-dimensional gesture in space.

11. The method of claim 9, further comprising:
publishing additional symbols to a graphical user interface as suggestions to complete the series of symbols as the series of symbols are received.

12. The method of claim 9, wherein the application comprises a telephone application, the method further comprising:
associating the symbol set with a name; and
publishing at least one telephone number associated with the name in a graphical user interface.

13. The method of claim 9, wherein the application comprises a network browser, the method further comprising:
initiating a search in the browser using at least a portion of the symbol set as a search string.

14. The method of claim 9, further comprising: receiving subsequent text at a touch interface; and
transmitting the subsequent text as a text message to an address associated with a name included in the symbol set.

15. The method of claim 9, wherein the application comprises a mapping application, the method further comprising:
publishing a map comprising a location associated with a name included in the symbol set.

16. The method of claim 9, further comprising: locating a stored image associated with the symbol set; and displaying the stored image on a display surface.

17. An apparatus comprising:
at least one processor hardware device and at least one memory hardware device connected to the at least one processor hardware device, the at least one memory hardware device configured with instructions representing a quick writing module, which, when executed by the at least one processor hardware device,
cause the apparatus to initiate symbol entry upon recognizing a symbol recognition process gesture, to recognize a series of symbols as they are received subsequent to the receiving of the symbol recognition process gesture, wherein recognizing a symbol in the series of symbols is achieved by searching for data representing an alphanumeric character matching the symbol, and to initiate one of beginning execution or continuing execution of an application of a plurality of applications by the processor hardware device in response to receiving the series of symbols as a symbol set comprising a string of alphanumeric characters matching the series of symbols that has been dragged into an icon associated with the application of the plurality of applications, the symbol set comprising the string of alphanumeric characters serving as input to the application such that the application processes the string of alphanumeric characters to provide output associated with the string of alphanumeric characters.

18. The apparatus of claim 17, further comprising:
a touch surface coupled to the processor, the touch surface to receive at least one of the symbol recognition process gesture or the series of symbols.

19. The apparatus of claim 17, further comprising:
a wireless transceiver communicatively coupled to the processor, the wireless transceiver to transmit at least a portion of the symbol set.

20. The apparatus of claim 17, further comprising:
a memory to store the symbol recognition process gesture; and a comparison module to compare the symbol recognition process gesture with a gesture received from a touch surface.

21. The apparatus of claim 17, further comprising:
an integral display to display the series of symbols as they are received on a display area, the display area included in a graphical user interface.

22. The apparatus of claim 17, further comprising:
a search engine to search a database stored in the apparatus to locate data associated with at least some of the series of symbols.

23. A non-transitory machine-readable medium comprising instructions, which when executed by one or more machines, cause the one or more machines to perform the following operations:
receive a symbol recognition process gesture indicating a starting point of symbol entry;
subsequent to the receiving of the symbol recognition process gesture, recognize a series of symbols as they are received subsequent to the receiving of the symbol recognition process gesture by searching for data representing an alphanumeric character that matches a received symbol in the series of symbols; and
instantiate the series of symbols as a symbol set comprising a string of alphanumeric characters matching the series of symbols upon receiving an indication that the string of alphanumeric characters has been moved from a first location to an icon in a second location where the icon represents a first application of a plurality of applications, wherein the instantiating serves to indicate an ending point of the symbol entry, and to provide the symbol set comprising the string of alphanumeric characters as a source of input to the first application represented by the icon.

24. The non-transitory machine-readable medium of claim 23, wherein the instructions, when executed by the one or more machines, cause the one or more machines to perform the following operations:
receive the series of symbols, one symbol at a time; and
publish the symbols in order of reception at a designated area of a graphical user interface.

25. The non-transitory machine-readable medium of claim 23, wherein the instructions, when executed by the one or more machines, cause the one or more machines to perform the following operations:
search for at least one of suggestions for completing the series of symbols, files associated with the series of symbols, or applications associated with the series of symbols; and
publish the at least one of the suggestions, names of the files, or icons associated with the applications.

* * * * *